United States Patent Office 3,476,729
Patented Nov. 4, 1969

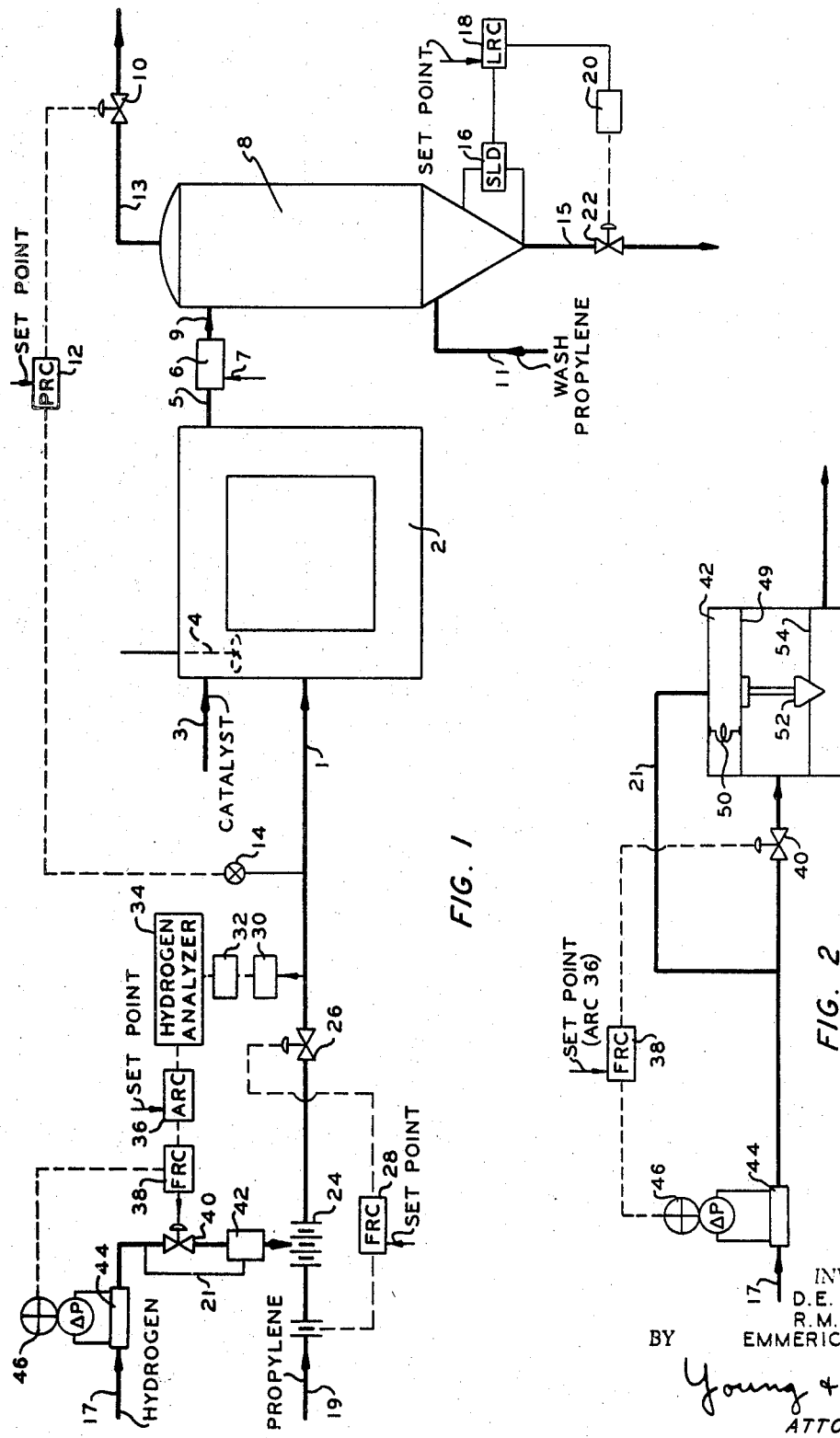

3,476,729
POLYMERIZATION PROCESS CONTROL AND
APPARATUS THEREFOR
Dexter E. Smith, Robert M. Keeler, and Emmerich
Guenther, Bartlesville, Okla., assignors to Phillips
Petroleum Company, a corporation of Delaware
Filed Feb. 17, 1964, Ser. No. 345,267
Int. Cl. C08f 1/56, 1/98, 3/10
U.S. Cl. 260—93.7                          7 Claims

ABSTRACT OF THE DISCLOSURE

The amount of modifier added to a polymerizable monomer stream is controlled by sampling the concentration of the modifier in the monomer stream, generating a signal representative of this concentration, and regulating the flow of the added monomer in response to this signal so as to maintain the concentration of the modifier in the monomer stream at a predetermined level. The regulation of the modifier flow is maintained independent of any pressure fluctuations in the polymerization system.

---

This invention relates to control of chemical reactions. In one aspect this invention relates to method and apparatus for controlling reaction conditions in an olefin polymerization. In another aspect this invention relates to improved control of the polymerization of olefins in the presence of a reaction modifier.

Various methods are known for producing normally solid and semi-solid polymers. Recently, considerable attention has been directed toward the production of solid olefin polymers such as polyethylene and polypropylene. These polymerizations are frequently carried out in the presence of a solid catalyst utilizing a liquid solvent, often the monomer, as the reaction medium. The reactions are also normally exothermic so that it is necessary to provide some means for removing the heat of reaction. Polymer characteristics are often affected by conditions of temperature, polymerization rate, polymer concentration, residence time of materials, and modifier concentration, e.g., hydrogen, in the reactor, since these conditions play a significant part in determining the average molecular weight and/or molecular weight distribution or other property of the product. Polymer melt index, such as a melt index value determined by the ASTM Method D–1238–57T "Measurement of the Flow Rate of Thermoplastics by Extrusion Plastomer," which is a property very important to fabricators, is affected to a considerable extent by the reaction temperature and hydrogen concentration in the reaction liquid while polymerizing propylene to form solid polypropylene. It is with the more accurate and reliable control of such polymerization reactions as well as other reactions that this invention is concerned.

It has already been proposed to regulate the melt index, flexural modulus and catalyst productivity in the production of polymers, such as polymers of propylene, by carrying out the polymerization in the presence of a very small concentration of hydrogen as a polymerization modifier. This process, of course, is not free from inconveniences. For example, it is very difficult to keep under control the exact concentration of hydrogen maintained in the liquid phase in the reaction zone and therefore, regulation of the melt index, flexural modulus, and catalyst productivity within the desired limits; flexural modulus and melt index being dependent upon the polymerization temperature and particularly dependent upon the concentration of hydrogen in the reaction medium during polymerization.

It is relatively difficult to automatically measure by use of an on-stream analyzer the hydrogen concentration of a sample from a polymerization reactor or from process streams downstream of the reactor because the presence of several percent of soluble and insoluble polymer presents a very difficult stream sampling problem.

A control system has been proposed which is essentially a cascade control system with a chromatographic analyzer recorder-controller automatically adjusting the set point of a flow recorder-controller which manipulates the rate of modifier addition to maintain a desired concentration of modifier at the analyzer sampling point in the monomer feed stream. In the polymerization of olefins with a loop reactor as is presently preferred in some operations, a portion of the reactor contents is periodically (intermittently) removed during so-called "dump" period, created by on-off discharge valve operation. This effluent discharge method, however, creates a problem in the feed control systems due to the pressure fluctuations resulting from the periodic dump of material from the reactor. These pressure fluctuations create considerable changes in the addition rates of the feed materials which causes non uniformity in feed composition and therefore inconsistent measurements to be made by the data devices, thus creating inconsistency control. We have now discovered an improved cascade control system for the addition of modifier to a polymerization reactor which overcomes the disadvantages of a conventional system operating in the face of pressure fluctuations caused by intermittent removal of material from the reactor.

Accordingly, it is an object of this invention to produce normally solid polymers having uniform physical properties and especially a desired, uniform melt index.

It is another object of this invention to provide method and means for maintaining a substantially uniform modifier concentration in the feed to a reaction zone.

Still another object of this invention is to provide an improved process and control system for regulating the addition of modifier to a monomer stream entering a polymerization reactor.

A further object of this invention is to prevent sudden considerable changes in the addition of materials, such as modifiers, to a reaction zone which is subject to sudden pressure changes.

Other objects, aspects and advantages of this invention will be apparent to one skilled in the art upon further study of this disclosure, the drawing and appended claims.

In accordance with our invention, a controller is employed in the flow regulation system for modifier addition to a chemical reaction system in conjunction with the flow regulation means to maintain a constant pressure differential between the inlet and the outlet of said flow regulation means.

A better understanding of the invention will be gained from the following description with reference to the accompanying drawings wherein, FIGURE 1 diagrammatically illustrates propylene polymerization utilizing the inventive control system, and FIGURE 2 is a detailed diagrammatic illustration of the control equipment to maintain a constant pressure drop across the hydrogen flow control means of FIGURE 1.

Referring now to FIGURE 1, a catalyst system such as one which forms upon mixing diethyl aluminum chloride and a titanium chloride complex is introduced into reactor 2 through conduit 3. Monomer to be polymerized, such as propylene, is introduced into reactor 2 through conduit 1. Reactor 2 is shown as a pipe loop reactor, which is maintained liquid full, and equipped with impeller 4 to vigorously circulate the contents. Particulate polymer is formed in the reaction mixture and the resulting slurry is removed from reactor 2 through conduit 5 and introduced into contact tank 6. Polymer treating compounds are introduced into contact tank 6 through conduit 7. The treated slurry is removed from contact tank 6 through conduit 9 and introduced into wash tank 8. In wash tank 8 separation of the solid polymer and liquid occurs with the polymer settling and forming a bed in the lower portion. Wash propylene is introduced into the lower portion of wash tank 8 through conduit 11. Propylene, soluble polymer and catalyst residues are removed from wash tank 8 through conduit 13. The material is removed through conduit 13 at a rate such as to maintain a predetermined pressure in reactor 2. This removal rate is accomplished by means of motor valve 10 positioned in conduit 13. Valve 10 is operatively connected to pressure recorder-controller 12 which is preset at the pressure to be maintained in reactor 2 by a set point signal. This controller receives a pressure measurement signal from pressure transmitter 14 which is operatively connected to line 1. Since line 1 is connetced to reactor 2, this pressure measurement signal corresponds to the pressure in the reactor.

As mentioned above, the solid polymer in the wash tank settles to the bottom of the tank. As a result of this settling, the slurry of solid polymer in propylene is removed through line 15 and generally contains up to about 50 weight percent solid polymer. The polymer in propylene is withdrawn from the wash tank through a suitable flow controller means, such as sequentially operated motor valve 22. This valve is operatively connected to timer 20 which controls the frequency of the valve's operation. The polymer can be withdrawn from the wash tank at any desired rate merely by adjusting the setting of the timer. The operational adjustment of the timer can also be made by means of a solids level controller 18 which is operatively connected to solids level detector 16 which in turn is operatively attached to the lower portion of wash tank 8 where solids level measurement is made and controlled to a desired value represented by the set point to a level recorder-controller 18. Also, valve 22 can be sequentially operated at regular time intervals with the duration of the time valve-open time being manipulated to achieve the desired discharge rate.

Propylene liquid, fresh and/or recycle, is introduced through conduit 19, mixer 24 and conduit 1 to reactor 2. A reaction modifier, hydrogen, is introduced to conduit 19 through conduit 17 into mixer 24, which optionally may be an orifice contactor as shown, a capillary sparger, or a vertical section of piping, hydrogen being introduced at a lower level therein. The flow of propylene through conduits 19 and 1 is regulated at a set point value by the operation of valve 26 within conduit 1 responsive to flow recorder-controller 28 operatively connected to a flow measuring element in conduit 19. A sample of the hydrogen-propylene stream in conduit 1 is vaporized in vaporizer-regulator 30, mixed and disturbance-filtered in tank 32 and analyzed for its hydrogen concentration by analyzer 34 and a signal indicative thereof is transmitted to analyzer-controller 36. Analyzer recorder-controller 36 compares this actual hydrogen concentration signal with a desired hydrogen concentration (a set point), which may be manually adjustable or automatically manipulated by a more comprehensive supervisory-type of control system if desired, and produces a first control signal which is transmitted to a flow recorder-controller 38. Hydrogen flow through conduit 17 is measured by laminar (or other) flow measuring element 44, a signal indicative thereof being produced and transmitted by differential pressure transmitter 46 to flow recorder-controller 38 wherein it is compared with the first control signal and a second control signal is produced which manipulates valve 40 in conduit 17 for regulating the flow of hydrogen therethrough. Controller 42 is operatively connected around valve 40 in conduit 17 by line 21 to maintain a constant pressure drop across valve 40 so that the regulation of the hydrogen flow by valve 40 is accomplished by the valve's position (relative opening) and is independent of fluctuations in differential pressure across the valve. Otherwise, fluctuations in hydrogen flow would be produced due to the characteristics of the intermittent discharge system, described above, whereby the pressure within pipe loop reactor 2 decreases suddenly and restores gradually due to polymer being withdrawn through conduit 15 intermittently. These pressure fluctuations propagate conduits to control valve 40 by way of 1, 19 and 17.

In FIGURE 2, like numerals refer to the same elements as in FIGURE 1. Controller 42, shown in detail, has flexible diaphragm 49 with needle valve 52 vertically depending therefrom and axially aligned in an opening of valve seat 54. Flow of hydrogen is introduced to controller 42 between the diaphragm and valve seat and exits controller 42 below the valve seat. The pressure drop is maintained by equalizer pressure line 21 connecting the top of diaphragm 49 with the upstream side of valve 40. Diaphragm 49 is maintained in position by tension spring 50 which allows the desired pressure drop to be maintained across valve 40.

Controller 42 can be a model 63 SUL Moore Controller as described in Bulletin 6302, 1960, of the Moore Products Company, Philadelphia, Pa. Laminar flow meter 44 can be a HICO Delta-P Flowmeter manufactured by Hughes Instruments and Controls. Mixer 32 can be a 540 series micron filter manufactured by Hoke Incorporated, Cresskill, N.J. The other instrumentation components are conventional and well known in the art.

In the above-described polymerization process, as the reactor is emptied or "dumped," the pressure in the reactor fluctuates in a saw-tooth pattern because the pressure tends to rise during the non-dump period due to the feeding of propylene and hydrogen and rapidly decreases during the dump since the dump rate exceeds the feed rate. The dump period is generally from about 1 to about 5 seconds and the non-dump time is considerably longer. This saw-tooth reactor pressure behavior causes sudden rate changes in the flow of liquid and gas to the reactor. We have improved the precision of a cascade control system by using laminar flow element 44 in the hydrogen inlet conduit 17 which provides a wide range of controllability. Also, since the hydrogen chromatographic analysis cycle time is longer than the nominal dump period of the reactor, the vaporizer regulator 30 and pneumatic mix tank 32 pneumatically filter variations in hydrogen concentration caused by variations in the ratio of flow rates of hydrogen to propylene during the dump cycle of the process. Such filtering of the sample is highly efficient without introducing significant time lags in the control loop. Another feature of our control system is the use, in combination, of a diaphragm motor valve 40 and controller 42. Controller 42 contains in part a diaphragm, a variable orifice, and a spring arranged to exert a fixed pressure or force on the diaphragm in such a direction as to hold the orifice open. In operation this flow controller and diaphragm motor valve maintain a pressure drop across the motor valve equal to the force of the spring, normally 3 p.s.i. drop across the motor valve. This combination operates to maintain a constant flow rate of hydrogen even with variations in pressure at the point where the hydrogen is introduced into the liquid propylene due to the extremely rapid sensing and corrective action of the controller 42.

As an example, in a process for polymerizing propylene wherein hydrogen is added to a liquid propylene stream so that the resulting mixture contains hydrogen in the range of 0.03 to 0.40 mol percent and this mixture is contacted with organometallic catalyst at a temperature in the range of 90 to 160° F. in a polymerization zone, when the equilibrium conditions are such that a 3 p.s.i. drop across the diaphragm motor valve and 47 p.s.i. drop across the orifice in controller 42 is present, and the pressure of the liquid at the point of hydrogen introduction to the propylene decreases by 10 p.s.i.g., the flow rate of hydrogen will start to increase. The pressure drop across the motor valve will increase and a greater pressure will be exterted on the diaphragm of the flow controller to increase the resistance of the orifice such that a new equilibrium will be reached with 3 p.s.i. drop across the diaphragm motor valve and 57 p.s.i. drop across the orifice of the flow controller due to the flow of hydrogen. The dynamic response of the flow controller being significantly faster than flow recorder-controller 38, an essentially constant pressure is maintained on the low pressure side of diaphragm motor valve 40 even though there are relatively large pressure variations downstream.

Our system operates to (1) maintain a constant flow rate of a fluid, such as hydrogen, in the presence of variations of downstream pressure; (2) provide an ideal environment for operation of the diaphragm motor valve by maintaining a constant differential pressure across the valve; and (3) provide a system which accurately maintains the flow rate of hydrogen as required to maintain a desired hydrogen concentration in the process fluid going to a polymerization reactor.

Although this invention has been described in connection with a gaseous hydrogen stream it is equally applicable to many fluid streams, including liquids.

As will be evident to those skilled in the art, various modifications of this invention can be made or followed in the light of the foregoing disclosure and discussion without departing from the spirit and scope of the disclosure or from the scope of the claims.

That which is claimed is:

1. A method for producing olefin polymers with improved properties comprising adding a stream containing controlled amounts of a polymerization modifier to a monomer stream, passing the resulting mixture to a reaction zone, continuously sampling said resulting mixture and determining the concentration of said modifier therein, producing a first signal representative of said concentration, comparing said first signal to a predetermined level representative of the desired modifier concentration to obtain a first control signal, the magnitude of which is related to the difference between said first signal and said predetermined level; measuring the flow rate of said modifier and producing a second signal representative of said measure flow; comparing said first control signal with said second signal to obtain a second control signal, the magnitude of which is related to the difference between said first control signal and said second signal; adjusting the flow rate of said modifier to said monomer stream responsive to said second control signal in a control zone until the desired level of said concentration is obtained thereby controlling the rate of addition of said modifier to said monomer stream responsive to said first signal so as to maintain said concentration in a predetermined range commensurate with the desired polymer product, maintaining a susbtantially constant pressure drop across said control zone in the presence of pressure variations in said modifier stream thereby maintaining the rate of addition of said modifier at desired controlled level independent of pressure variations in said modifier stream, and contacting said resulting mixture with a polymerization catalyst in said reaction zone under polymerization conditions thereby producing a polymer product with improved properties and recovering said polymer product.

2. The method according to claim 1 further comprising passing a sample of said resulting mixture through regulating, mixing and filtering steps before determining the concentration of said modifier therein.

3. A process for polymerizing propylene comprising adding a quantity of hydrogen to a liquid propylene stream so that the resulting mixture contains hydrogen in the range of 0.03 to 0.40 mol percent, passing said resulting mixture to a polymerization zone, continuously sampling and determining the hydrogen concentration in said resulting mixture passing to said polymerization zone, producing a signal representative of said concentration, adjusting the rate of addition of hydrogen to said propylene stream responsive to the difference between said signal and a second signal representative of a predetermined concentration within said desired range of hydrogen concentration in a control zone, maintaining a substantially constant pressure drop in said control zone in the presence of pressure variations in the hydrogen stream, contacting organometallic catalysts with said resulting mixture at a temperature in the range of 90 to 160° F. in said polymerization zone and recovering polypropylene.

4. An apparatus for polymerization comprising, in combination, a reactor, means for withdrawing polymerized product from said reactor, first conduit means for feeding catalyst to said reactor, second conduit means for feeding the monomer to said reactor, third conduit means for adding modifier into monomer feed in communication with said second conduit means, means for mixing said monomer and modifier disposed in said second conduit means where the third conduit means attaches thereto, control valve means for controlling the rate of modifier flow disposed in third conduit means, pressure control means for maintaining a substantially constant pressure differential across said control valve means in the presence of pressure variations in said third conduit means, an analyzer operably attached to said second conduit means downstream of said means for mixing for determining the concentration of modifier in the stream flowing therethrough and transmitting a signal representative of said concentration, and means responsive to signal transmitted by said analyzer for manipulating said control valve means to obtain the desired flow of said modifier through said third conduit means to obtain the desired modifier concentration in the stream flowing through said second conduit means.

5. The apparatus according to claim 4 wherein said responsive means comprises a means for measuring the flow rate of said modifier in said third conduit means disposed therein upstream of said control valve means and transmitting a signal representative thereof, a first controller comparing the modifier concentration signal from said analyzer to a set point and producing a first control signal, the magnitude of which is representative of the differential between said set point and said modifier concentration, a second controller comparing said first control signal with measured-flow signal and producing a signal to manipulate said control valve means, the magnitude of which is representative of the differential between the actual modifier flow and the desired modifier flow.

6. The apparatus according to claim 5 wherein said pressure control means comprises a constant differential flow controller communicating with third conduit means upstream and downstream of said control valve means.

7. The apparatus of claim 6 wherein said flow measuring means comprises a laminar flow meter.

References Cited
UNITED STATES PATENTS 3,146,223   8/1964   Cheney _____ 260—94.9

JAMES A. SEIDLECK, Primary Examiner

U.S. Cl. X.R.

23—253; 260—94.9